(12) United States Patent
Bonardo et al.

(10) Patent No.: US 11,834,126 B2
(45) Date of Patent: Dec. 5, 2023

(54) HYDRAULIC BRAKE DISTRIBUTOR FOR A TWO-WHEELED VEHICLE

(71) Applicant: RAICAM DRIVELINE S.R.L., Mondovi' (IT)

(72) Inventors: Sandro Bonardo, Peveragno (IT); Matteo Giaccardi, Piozzo (IT)

(73) Assignee: RAICAM DRIVELINE S.R.L., Mondovi' (IT)

( * ) Notice: Subject to any disclaimer, the term of this patent is extended or adjusted under 35 U.S.C. 154(b) by 0 days.

(21) Appl. No.: 17/757,753

(22) PCT Filed: Dec. 21, 2020

(86) PCT No.: PCT/IB2020/062295
§ 371 (c)(1),
(2) Date: Jun. 20, 2022

(87) PCT Pub. No.: WO2021/124310
PCT Pub. Date: Jun. 24, 2021

(65) Prior Publication Data
US 2023/0020090 A1    Jan. 19, 2023

(30) Foreign Application Priority Data
Dec. 20, 2019   (IT) .......................... 102019000025105

(51) Int. Cl.
*B62L 3/08*           (2006.01)
*B60T 11/24*          (2006.01)
(Continued)

(52) U.S. Cl.
CPC ............... *B62L 3/08* (2013.01); *B60T 8/261* (2013.01); *B60T 11/101* (2013.01); *B60T 11/24* (2013.01);
(Continued)

(58) Field of Classification Search
CPC .......... B60T 8/26; B60T 8/261; B60T 8/3225; B60T 11/101; B60T 11/24; B60T 11/34; B60T 17/00; B60T 17/226; B62L 3/08
(Continued)

(56) References Cited

U.S. PATENT DOCUMENTS

| | | | | |
|---|---|---|---|---|
| 3,472,559 A * | 10/1969 | Bueler | ...................... | B60T 8/26 200/82 D |
| 3,508,793 A * | 4/1970 | Bueler | .................... | B60T 11/34 200/82 D |
| 3,597,014 A * | 8/1971 | Stokes | .................. | B60T 17/226 200/82 D |
| 3,608,977 A * | 9/1971 | Kersting | ............... | B60T 17/226 200/82 D |
| 3,637,963 A * | 1/1972 | Wellman | ................. | B60T 11/34 200/82 D |

(Continued)

FOREIGN PATENT DOCUMENTS

| | | |
|---|---|---|
| CN | 102582759 A | 7/2012 |
| CN | 102745293 A | 10/2012 |

(Continued)

OTHER PUBLICATIONS

International Search Report and Written Opinion for International Patent Application No. PCT/IB2020/062295, dated May 19, 2021, 10 pages.

*Primary Examiner* — Thomas J Williams
(74) *Attorney, Agent, or Firm* — Armstrong Teasdale LLP

(57) ABSTRACT

A hydraulic brake distributor for a two-wheeled vehicle has an outer body that forms an internal cavity accommodating two floating piston valve elements. The two floating piston valve elements are axially movable and mutually coupled in a telescopic manner. One of the two floating piston valve elements has an internal through-channel.

12 Claims, 3 Drawing Sheets

(51) Int. Cl.
*B60T 8/26* (2006.01)
*B60T 17/00* (2006.01)
*B60T 17/22* (2006.01)
*B60T 11/34* (2006.01)
*B60T 11/10* (2006.01)
*B60T 8/32* (2006.01)

(52) U.S. Cl.
CPC ............... *B60T 11/34* (2013.01); *B60T 17/00* (2013.01); *B60T 17/226* (2013.01); *B60T 8/3225* (2013.01)

(58) Field of Classification Search
USPC .................................................. 303/137, 186
See application file for complete search history.

(56) References Cited

U.S. PATENT DOCUMENTS

| | | | |
|---|---|---|---|
| 3,752,535 A * | 8/1973 | Wallace | B60T 8/26 303/9.63 |
| 4,289,359 A | 9/1981 | Lüpertz et al. | |
| 5,544,946 A * | 8/1996 | Toyoda | B60T 8/261 188/344 |
| 2023/0020090 A1* | 1/2023 | Bonardo | B60T 8/261 |

FOREIGN PATENT DOCUMENTS

| | | | | |
|---|---|---|---|---|
| DE | 2847571 A * | 5/1980 | ............. | B60T 11/34 |
| DE | 3011138 A1 | 10/1981 | | |
| EP | 1520763 A1 | 4/2005 | | |
| JP | 58073462 A * | 5/1983 | ................ | B60T 8/26 |

* cited by examiner

HYDRAULIC BRAKE DISTRIBUTOR FOR A TWO-WHEELED VEHICLE

CROSS-REFERENCE TO RELATED APPLICATION

This application is a National Stage Application of International Patent Application No. PCT/IB2020/062295, having an International Filing Date of Dec. 21, 2020, claiming priority to Italian Patent Application No. 102019000025105, having a filing date of Dec. 20, 2019, each of which is hereby incorporated by reference in its entirety.

Field of the Invention

The present invention relates to a hydraulic brake distributor for two-wheeled vehicles which may advantageously benefit from combined braking, for example bicycles, motorcycles and scooters.

BACKGROUND OF THE INVENTION

Combined (or integral) braking systems for two-wheeled vehicles are known which are capable of distributing the braking force to both the front wheel and the rear wheel simultaneously. In combined braking systems, instead of assigning the action of the front and rear brakes to two separate controls, a single control simultaneously actuates the front and rear brakes.

Patent publication CN 102582759 B discloses a combined braking system (or integral braking system) comprising a hydraulic brake distributor that has an outer body comprising two inlets and two outlets for the brake fluid. Each of the two inlets is operatively associated with a relevant brake control, and the two outlets are respectively connected in fluid communication to the brake of the front wheel and to the brake of the rear wheel, respectively. A cylindrical cavity is formed inside the body of the actuator, which cavity is in communication with the outlets and the inlets. A single piston valve element provided with sealing gaskets that act against the internal wall of the cylindrical cavity is axially movable within the cylindrical cavity. The actuation of a first of the two brake controls causes the valve element to move, with a consequent flow of brake fluid to both the front and rear brakes simultaneously. The actuation of the second brake control causes brake fluid to flow toward only one of the brakes, either the front or rear.

Patent publication CN 102745293 A discloses a combined braking system comprising a hydraulic brake distributor that has an outer body which forms a cylindrical cavity in communication with two outlets and two inlets for the brake fluid. Two separate valve elements which are axially aligned and axially movable in the cavity are axially movably mounted in the cylindrical cavity. The valve elements are provided with sealing gaskets that act against the internal wall of the cylindrical cavity. The actuation of a first of the two brake controls causes brake fluid to flow into the cylindrical cavity from an inlet arranged in an intermediate position between two piston valve elements. The actuation of the first brake control causes both of the piston valve elements to move, with a consequent simultaneous flow of brake fluid toward both the front and rear brakes. The actuation of the second brake control causes brake fluid to flow toward only one of the brakes, either the front or rear.

SUMMARY OF THE INVENTION

It is an object of the present invention to provide a hydraulic distributor capable of providing combined braking simultaneously on both the front and rear wheels of a two-wheeled vehicle, regardless of whichever brake control is actuated.

The aforesaid and other objects and advantages, which will be better understood in the following detailed description, are achieved, according to one aspect of the present invention, by a hydraulic brake distributor as described and claimed herein. Preferred embodiments of the hydraulic brake distributor are also described.

BRIEF DESCRIPTION OF THE DRAWINGS

A few preferred, but non-limiting embodiments of a hydraulic brake distributor according to the invention will now be described, with reference to the accompanying drawings, in which.

DETAILED DESCRIPTION

Figure 1:
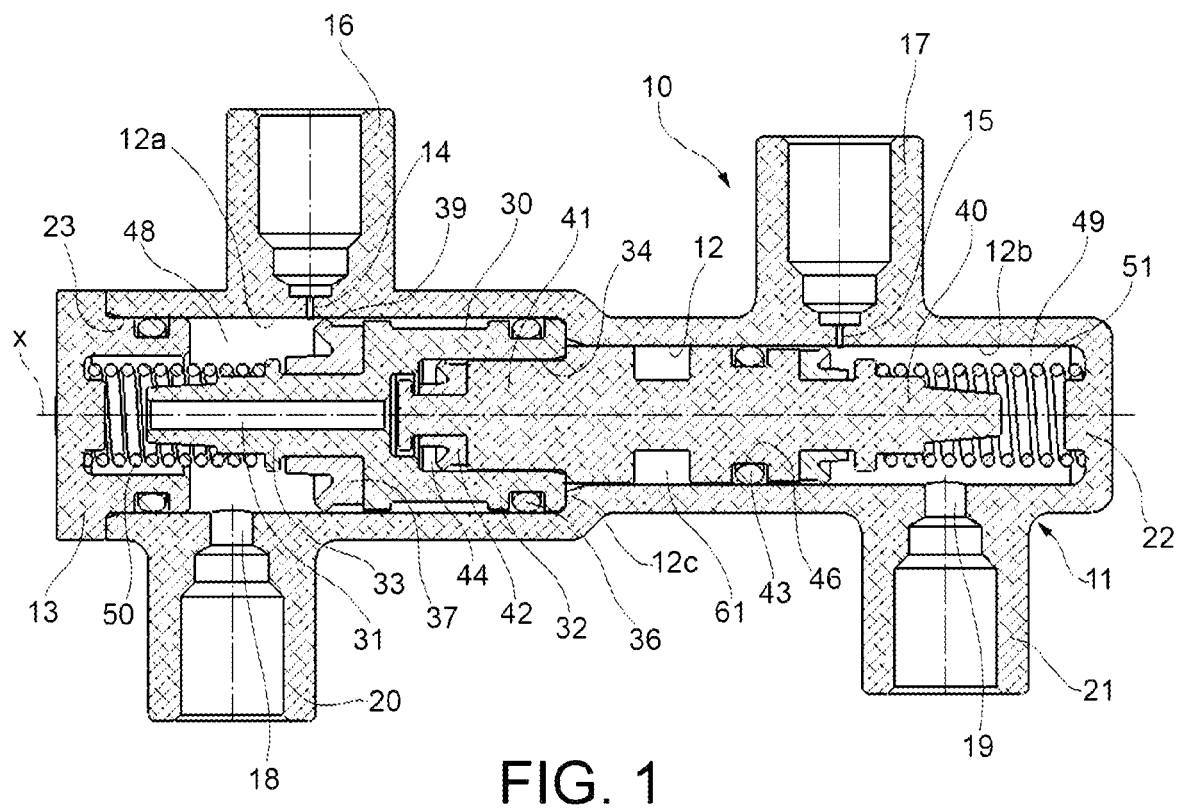
FIGS. 1, 2 and 3 are schematic longitudinal sectional views of a brake distributor in three different operating positions.
Figure 2:
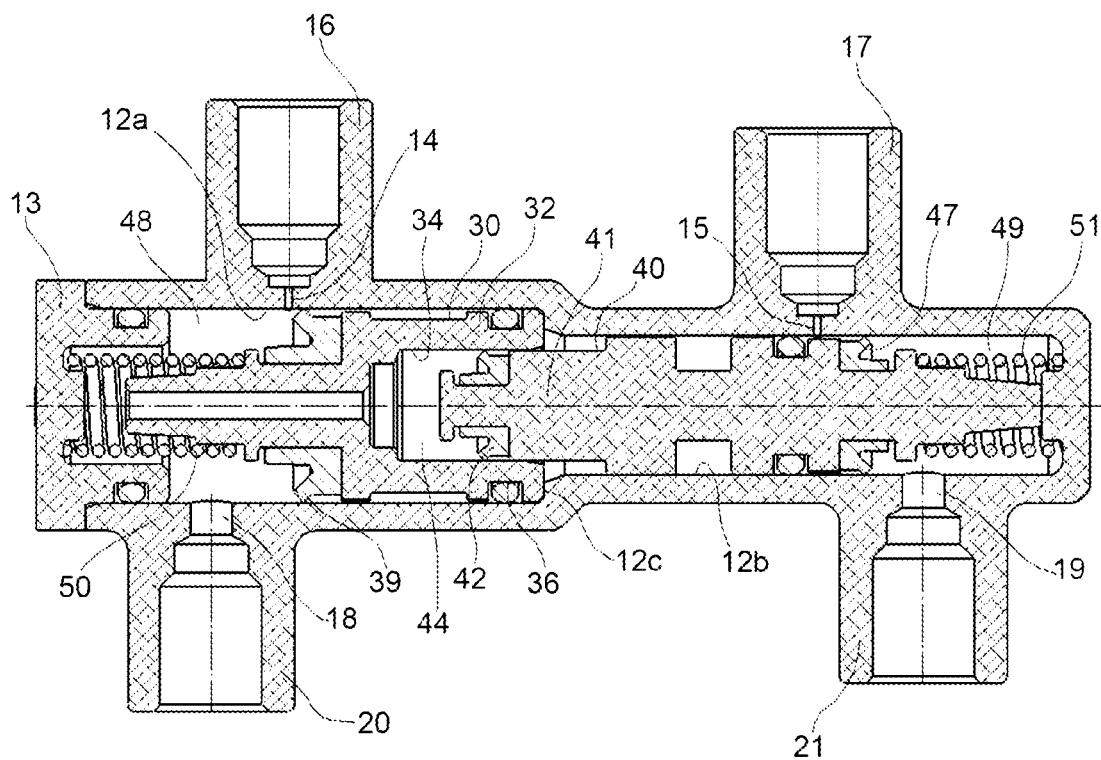
Figure 3:
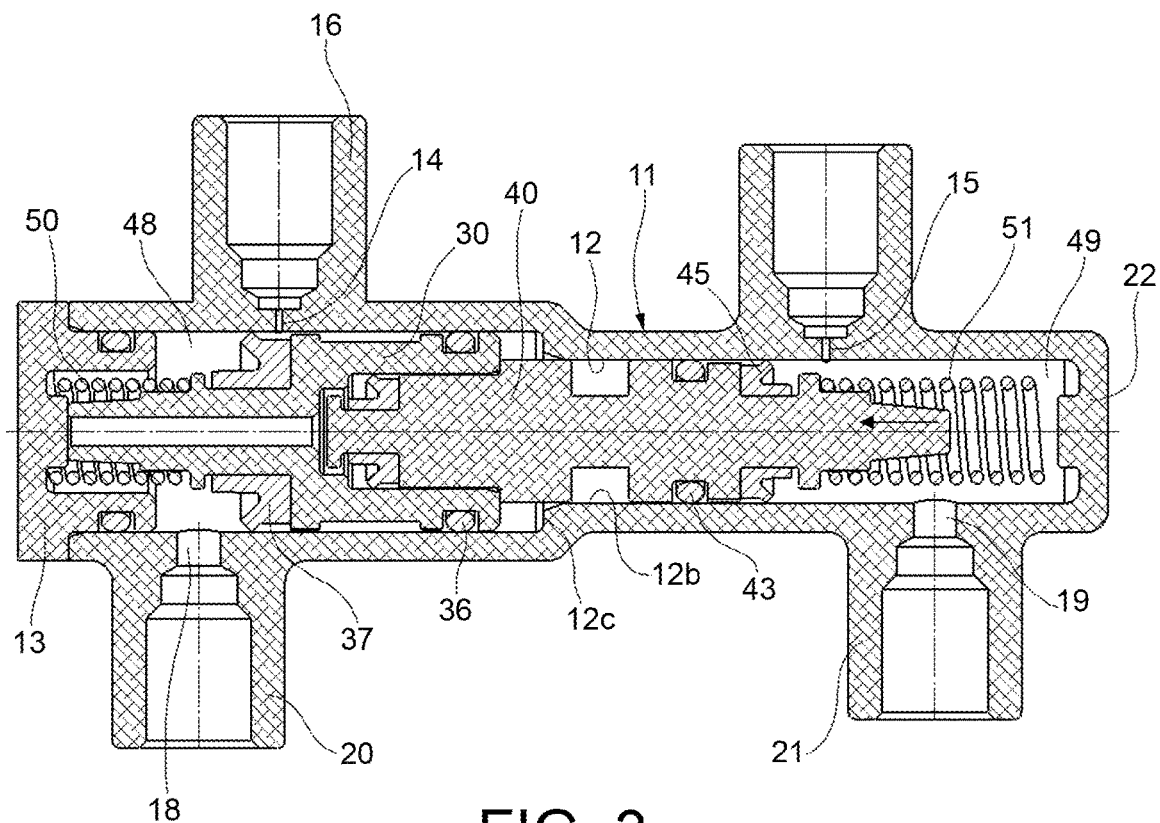

With initial reference to FIGS. 1 to 3, the reference numeral 11 designates, as a whole, the outer body of a hydraulic distributor 10 for a combined braking system of a two-wheeled vehicle. The body 11 defines a central longitudinal axis x and has an internal cavity 12 extending in a direction defined here as the longitudinal or axial direction. As used herein, terms and expressions that indicate orientations such as "longitudinal" or "axial" and "transverse" or "radial", should be construed to refer to the longitudinal axis x of the body of the distributor.

The internal cavity 12 accommodates two piston valve elements 30, 40 which are axially movable. The two piston valve elements 30, 40 are floating and mutually coupled so as to be able to slide telescopically in the axial direction. As a result of the telescopic coupling, the first piston valve element 30 may also be defined as an external tubular piston valve element, while the second piston valve element 40 may also be defined as an internal piston valve element.

As a whole, the body 11 may have a generally cylindrical shape which extends axially and has two opposite axial ends, in this case defined as the left-hand end and right-hand end with reference to the figures. For constructional purposes, the body 11 is advantageously composed of a main body having a substantially tubular shape, with an axial end closed by a transverse wall 22 (on the right in the figures) and an opposite axial end (on the left) which has an opening 23 hermetically sealed by a plug 13.

The body 11 has a first inlet 14 which is hydraulically connectable to a first brake control (not shown) of the vehicle, and at least one second inlet 15 which is hydraulically connectable to a second brake control (not shown) of the vehicle. The first inlet 14 comprises at least one inlet hole and an inlet connector 16. More inlet holes 14, for example lying in the same radial plane (perpendicularly to the drawing in FIG. 1), may be provided connected to one single connector. Likewise, the second inlet 15 comprises one or more inlet holes and an inlet connector 17.

The body 11 also forms a first outlet 18 which is hydraulically connectable to a front brake (not shown) of the vehicle, and a second outlet 19 which is hydraulically connectable to a rear brake (not shown) of the vehicle.

Reference signs 20 and 21 indicate connectors of the respective outlet holes 18 and 19. Typically, the brake controls which send a brake fluid to the inlets 14, 15 may be manual control levers arranged on the handlebar of the two-wheeled vehicle, or pedal controls. The specific type of brake control and its arrangement on the two-wheeled vehicle are not considered to be limiting aspects for the implementation of the present invention.

The inside of the body 11 of the distributor defines two non-communicating hydraulic chambers 48, 49. A first hydraulic chamber 48 communicates with the first inlet 14 and the first outlet 18, and is delimited by the first section 12a of the internal cavity 12 and by the first piston valve element 30. A second hydraulic chamber 49 communicates with the second inlet 15 and the second outlet 19, and is delimited by the second section 12b of the internal cavity 12 and by the second piston valve element 40.

According to an embodiment, the internal cavity 12 has a cavity section 12a having a larger diameter and a cavity section 12b having a smaller diameter. A radial shoulder 12c is provided between the cavity sections 12a and 12b.

For assembly reasons, the cavity section 12a having a larger diameter preferably forms the left-hand end opening 23 of the body 11 that receives the plug 13, while the cavity section 12b having a smaller diameter forms the back transverse wall 22 at the opposite end (on the right) to the left-hand end opening 23.

The piston valve element 30 is slidably mounted in the cavity section 12a having a larger diameter, and has an internal through-channel 31 extending axially. The piston valve element 30 forms a larger-diameter portion 32, in this example in the form of a cylindrical cup, which slidingly engages in the cavity section 12a having a larger diameter, and a shank portion 33 facing the plug 13.

The internal channel 31 opens to form a cylindrical seat 34 in the larger-diameter portion 32 in order to partially accommodate an end portion or head 41 of the piston valve element 40.

Two sliding-contact sealing gaskets 36, 37 are mounted on the piston valve element 30 in order to slide against the cylindrical surface of the cavity section 12a having a larger diameter.

A first sliding-contact sealing gasket 36 is mounted on the larger-diameter portion 32 of the first piston valve element 30. The gasket 36 is preferably a static gasket, for example an O-ring gasket, accommodated in an annular groove 38 on the first piston valve element 30, in proximity to an end of the first piston valve element 30 that faces the second piston valve element 40.

A second sliding-contact sealing gasket 37 is mounted on the piston valve element 30 so as to be axially spaced from the first sealing gasket 36, in a position closer to the left-hand end of the cavity. The sealing gasket 37 has a flexible conical lip 39 which widens in a radially outer direction toward the left-hand end of the cavity 12.

An elastic contrast element 50 is arranged between the first piston valve element 30 and the body of the hydraulic distributor 10, in this example the plug of the body, in order to axially urge the first piston valve element 30 toward the opposite end of the internal cavity 12 and toward the second piston valve element 40. The elastic element 50 is preferably in the form of a helical compression spring, mounted on the shank portion 33 of the first piston valve element 30.

The piston valve element 30 is axially movable, inside the cavity section 12a, between a passive position (FIG. 2), in which the elastic element 50 is extended and the piston valve element 30 abuts against the shoulder 12c, and an active position (FIG. 3), in which the spring is elastically compressed and the piston valve element 30 abuts against the left-hand back wall of the body 11, in particular against the plug 13. FIG. 1 shows a non-braking situation in which the piston valve element 30 is in an intermediate equilibrium position between the two opposite passive and active positions described above.

The piston valve element 40 is slidably mounted in the cavity section 12b having a smaller diameter, and the end portion or head 41 is shaped and dimensioned substantially sufficiently for the head 41 to be able to be sealingly accommodated in the cylindrical seat 34. The end head 41 and the cylindrical seat 34 are preferably correspondingly and substantially congruently shaped and dimensioned. A sealing gasket 42 is mounted on the head portion 41 in order to slidingly engage the cylindrical seat 34.

The end portion 41 of the second piston valve element and the cylindrical seat 34 of the first piston valve element together define an axially expandable hydraulic chamber 44 which communicates with the first hydraulic chamber 48.

Two sliding-contact sealing gaskets 43, 45 are mounted on the second piston valve element 40 in order to slide against the cylindrical surface of the cavity section 12b having a smaller diameter. A first sliding-contact sealing gasket 43, preferably a static O-ring gasket, is accommodated in an annular groove 46 on the piston valve element 40.

A second sliding-contact sealing gasket 45 is mounted on the piston valve element 40 so as to be axially spaced from the first sealing gasket 43, in a position closer to the right-hand end of the internal cavity 12. The sealing gasket 45 has a flexible conical lip 47 which widens in a radially outer direction toward the right-hand end of the internal cavity 12.

An elastic contrast element 51 is arranged between the second piston valve element 40 and the body of the hydraulic distributor 10, in this example the back transverse wall 22, in order to axially urge the second piston valve element 40 toward the opposite end of the internal cavity 12 and toward the first piston valve element 30. The elastic element 51 is preferably in the form of a helical compression spring, mounted on the second piston valve element 40.

The second piston valve element 40 is axially movable, inside the cavity section 12b, between a passive position (FIG. 3), in which the spring 51 is extended and the second piston valve element 40 abuts against the first piston valve element 30 (which in turn abuts against the terminal plug 13), and an active position (FIG. 2), in which the spring 51 is compressed and the piston valve element 40 abuts against the right-hand back transverse wall 22 of the body 11.

The operation of the brake distributor described above is as follows. While a two-wheeled vehicle that incorporates the brake distributor is moving, when the vehicle is not braked, the distributor is in the condition shown in FIG. 1.

In the non-braking condition (FIG. 1), the piston valve elements 30 and 40 are in an intermediate equilibrium position between the two opposite passive and active positions described above. In the non-braking condition, the two springs 50, 51 are in equilibrium against one another and keep the piston valve elements 30, 40 abutted one against the other. The axially expandable hydraulic chamber 44 has a minimum volume.

As a result of a command given to a first brake control, for example by actuating a first manual control lever (not shown) of the brakes that is mounted on the handlebar of the vehicle and associated with a brake pump (not shown), the brake fluid is introduced into the first hydraulic chamber 48 from the first inlet 14 (FIG. 2).

When the brake fluid enters from the inlet 14, part of the brake fluid that enters the first hydraulic chamber 48 passes through said chamber, exits directly from the outlet 18 and goes to actuate the rear brake. The pressure in the first hydraulic chamber 48 increases, and therefore the first piston valve element 30 is moved to the right and abuts against the shoulder 12c. At the same time, part of the brake fluid in the first hydraulic chamber 48 passes through the internal channel 31, reaches the cylindrical seat 34 and dilates the expandable hydraulic chamber 44, thereby moving the second piston valve element 40 to the right. The gasket 42 acting between the two piston valve elements 30, 40 prevents the brake fluid in the circuit of the front brake from mixing with the brake fluid in the circuit of the rear brake. The movement of the second piston valve element 40 to the right increases the pressure of the brake fluid present in the second hydraulic chamber 49, with a consequent flow of brake fluid from the outlet 19 toward the rear brake. By moving to the right, the second piston valve element 40 brings the gasket 47 into a position which is further right than the inlet 15, thereby preventing brake fluid from flowing back into the inlet 15 of the second hydraulic chamber 49.

By actuating a second brake control, for example by actuating a second manual control lever (not shown) of the brakes that is mounted on the handlebar of the vehicle and associated with a brake pump (not shown), the brake fluid is introduced into the second hydraulic chamber 49 from the second inlet 15 (FIG. 3).

When the brake fluid arrives from the inlet 15 (FIG. 3), part of the brake fluid that enters the second hydraulic chamber 49 passes through said chamber and exits directly from the outlet 19, thereby actuating the front brake. The pressure of the brake fluid in the second hydraulic chamber increases. The second piston valve element 40 is moved to the left, thereby also pushing the first piston valve element 30 to the left. By moving to the left, the first piston valve element 30 brings the gasket 37 into a position that is further left than the inlet 14, thereby preventing brake fluid from flowing back into the inlet 14 of the first hydraulic chamber 48.

In the event that the first brake control and the second brake control are actuated together, the two flows of brake fluid from the inlets 14, 15 pass through the respective chambers 48, 49 and exit toward the respective outlets 18, 19, substantially according to a traditional design of a non-combined braking system. In the configuration shown in FIG. 1, the two piston valve elements 30, 40 are substantially in equilibrium.

If one of the two brake controls is actuated when the other control is already active, the flow of brake fluid resulting from the actuation of the second control is made possible by the flexibility of the gaskets 37 and 45. If, for example, the flow of the brake fluid is controlled when the piston valve elements 30, 40 are in the position moved to the right (FIG. 2), the introduction of brake fluid from the hole 15 is made possible by the flexibility of the conical lip 47 of the gasket 45, which is inclined in a radially outer and axially outer direction, i.e. toward the end of the cavity in which the gasket 47 is arranged. The second piston valve element 40 is in fact arranged in such a position that the inlet 15 is arranged between the static gasket 43 and the sealing gasket 45 having a flexible lip 47. Similar behavior is also observed if the pressure of the brake fluid sent by a brake control is greater than the pressure of the brake fluid simultaneously sent by the other control. For example, if the pressure of the fluid that reaches the second hydraulic chamber 49 is greater than the pressure in the first hydraulic chamber 48, the two piston valve elements 30, 40 will move to the left together, thereby allowing fluid to flow to both of the rear brakes as a result of the flexibility of the lip 39 of the gasket 37.

The distribution of the braking force between the front wheel and rear wheel may be varied by selecting elastic elements 50, 51 of different strengths, and/or by suitably dimensioning the diameters of the hydraulic chambers 48, 49 and therefore the cross-sectional area thereof. For example, reducing the diameter of one hydraulic chamber, with the same volume of brake fluid introduced, produces a greater linear movement of the piston and a less intense thrust, as the cross-sectional area of the hydraulic chamber has reduced.

Figure 4:
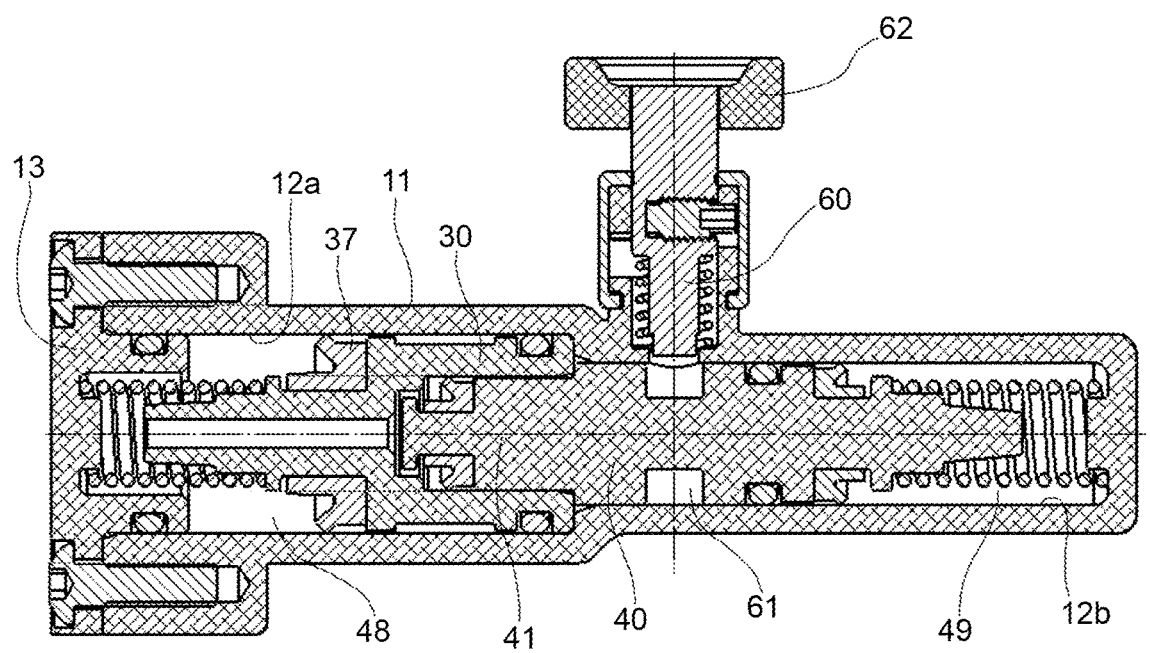
FIGS. 4 and 5 are two schematic axial sectional views, along sectional planes orthogonal with respect to those in FIGS. 1-3, of an alternative embodiment of the distributor, respectively shown in an unlocked and locked condition.
Figure 5:
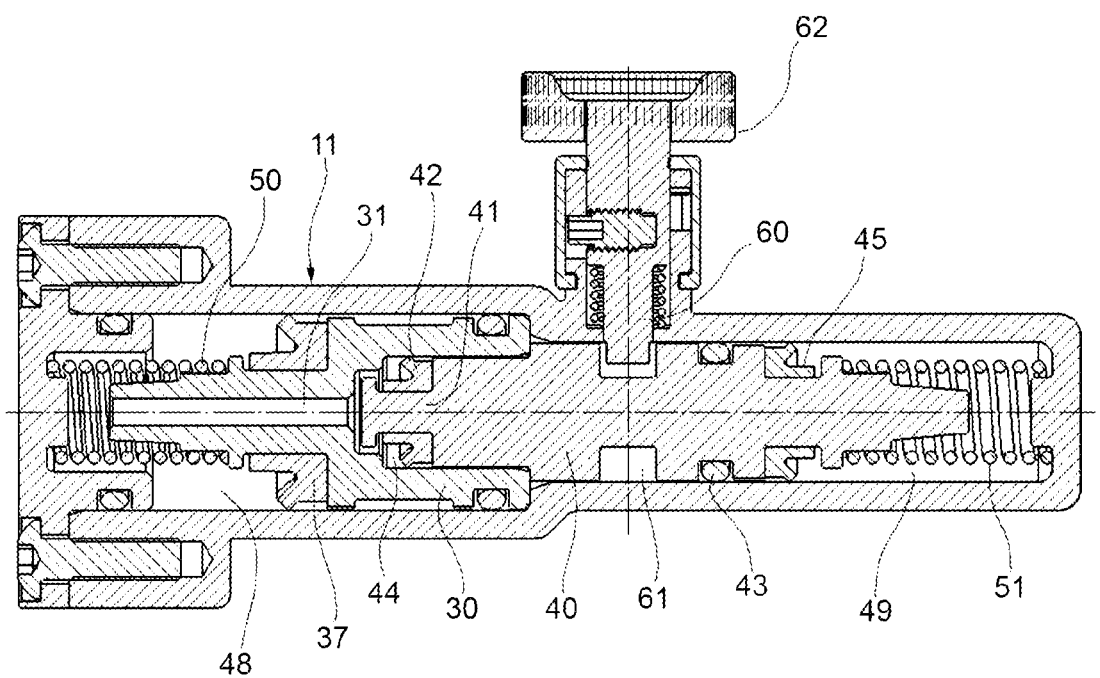

In some embodiments, the hydraulic distributor may optionally be provided with a locking mechanism in order to selectively cut out the operation of the hydraulic distributor, when a combined brake is not desired. With reference to the example in FIGS. 4 and 5, a latch locking element 60, extending radially with respect to the longitudinal or axial direction of movement of the piston valve elements 30, 40, is mounted on the body 11 of the hydraulic distributor in a substantially central axial position. The latch locking element 60 may be moved into a position which is radially further inward or closer to the central longitudinal axis of the hydraulic distributor, in order to engage a (preferably annular) radial recess 61 of the second piston valve element 40 and thereby lock the axial movement thereof. In the locked position (FIG. 5), both of the inlets 14, 15 of the hydraulic chambers 48, 49 are in direct fluid communication with the respective outlets 18, 19, according to a non-combined braking arrangement.

According to an embodiment, the radial movement of the latch locking element 60 may be controlled by a knob 62.

The radial locking recess 61 is advantageously arranged in a zone between the sealing gaskets 43 and 36, in a dry zone which may not be reached by the brake fluid of the front and rear braking circuits.

Various aspects and embodiments of the brake distributor have been described; it is understood that each embodiment may be combined with any other embodiment. Furthermore, the embodiments and the constructional details may be widely varied with respect to that which has been described and illustrated purely by way of non-limiting example, without thereby departing from the scope of the invention, as defined in the appended claims.

What is claimed is:

1. A hydraulic brake distributor for a two-wheeled vehicle, comprising:
  an outer body, comprising
    at least one first inlet hydraulically connectable to a first brake control of the two-wheeled vehicle,
    at least one second inlet hydraulically connectable to a second brake control of the two-wheeled vehicle,
    at least one first outlet hydraulically connectable to a front brake of the two-wheeled vehicle,
    at least one second outlet hydraulically connectable to a rear brake of the two-wheeled vehicle, and
    an internal cavity extending axially and defining two opposite axial ends;
  a first floating piston valve element and a second floating piston valve element, mutually coupled in a telescopically sliding manner and axially movable in the internal cavity, wherein the first floating piston valve element comprises an axially extending internal through-channel and a cylindrical seat at one end thereof communicating with the axially extending internal through-channel and open towards the second floating piston valve element, and the second floating piston valve element comprises an end portion slidably sealingly engaged in the cylindrical seat of the first floating piston valve element and defining with the cylindrical seat an axially expandable hydraulic chamber, and a sealing gasket mounted on said end portion of the second floating piston valve element for slidably engaging the cylindrical seat in the first floating piston valve element;

a first elastic element axially urging the first floating piston valve element towards the second floating piston valve element and away from a first axial end of the internal cavity, and a second elastic element axially urging the second floating piston valve element towards the first floating piston valve element and away from a second axial end of the internal cavity;

a first pair of axially spaced sealing gaskets mounted on the first floating piston valve element and engaged in sliding contact against a first cylindrical section of the internal cavity; and a second pair of axially spaced sealing gaskets mounted on the second floating piston valve element and engaged in sliding contact against a second cylindrical section of the internal cavity; and two non-communicating hydraulic chambers, defined within the internal cavity:
  a first hydraulic chamber, communicating with the at least one first inlet and the at least one first outlet, and delimited by the first cylindrical section of the internal cavity and by the first floating piston valve element and communicating through said axially extending internal through-channel with the axially expandable hydraulic chamber; and
  a second hydraulic chamber, communicating with the at least one second inlet and the at least one second outlet, and delimited by the second cylindrical section of the internal cavity and the second floating piston valve element.

2. The hydraulic brake distributor of claim 1, wherein the first cylindrical section of the internal cavity has a larger diameter than the second cylindrical section of the internal cavity.

3. The hydraulic brake distributor of claim 2, wherein the internal cavity comprises a radial shoulder between the first and second cylindrical sections.

4. The hydraulic brake distributor of claim 2 wherein the first cylindrical section forms an end opening of the outer body closed by a plug.

5. The hydraulic brake distributor of claim 1, wherein the first pair of axially spaced sealing gaskets on the first floating piston valve element comprises:

a first sealing gasket mounted adjacent to an end of the first floating piston valve element facing the second floating piston valve element, and a second sealing gasket axially spaced from the first sealing gasket towards a first axial end of the internal cavity and having a flexible conical lip that widens in a radially outer direction towards said first axial end of the internal cavity.

6. The hydraulic brake distributor of claim 5, wherein the first sealing gasket is an O-ring sealing gasket.

7. The hydraulic brake distributor of claim 1, wherein the first floating piston valve element comprises
  a larger-diameter portion shaped like a cylindrical cup that provides the cylindrical seat, and
  a shank portion through which the axially extending internal through-channel is formed.

8. The hydraulic brake distributor of claim 1, wherein the second pair of axially spaced sealing gaskets on the second floating piston valve element comprises
  a first sealing gasket closer to the first floating piston valve element, and
  a second sealing gasket axially spaced from the first sealing gasket towards a second axial end of the internal cavity and having a flexible conical lip that widens in a radially outer direction towards said second axial end of the internal cavity.

9. The hydraulic brake distributor of claim 8, wherein the first sealing gasket is an O-ring sealing gasket.

10. The hydraulic brake distributor of claim 1, comprising a locking mechanism for selectively cutting out operation of the hydraulic brake distributor, the locking mechanism comprising a locking element adjustable in a transverse direction from
  a disengaged position, radially spaced from the first and second floating piston valve elements to
  a radially engaged position in a radial recess of one of the floating piston valve elements.

11. The hydraulic brake distributor of claim 10, wherein the radial recess is shaped as an annular groove.

12. The hydraulic brake distributor of claim 10, wherein a sealing gasket is mounted on an end portion of the second floating piston valve element for slidably engaging the cylindrical seat in the first floating piston valve element, and wherein the radial recess is placed on the second floating piston valve element in a dry area not reached by brake fluid and axially between
  the first pair of axially spaced sealing gaskets of the first floating piston valve element and the sealing gasket in the cylindrical seat, on one side, and
  the second pair of axially spaced sealing gaskets of the second floating piston valve element on an opposite side.

* * * * *